US011252562B2

(12) United States Patent
Menard et al.

(10) Patent No.: US 11,252,562 B2
(45) Date of Patent: Feb. 15, 2022

(54) METHOD FOR SECURING A COMMAND TO BE APPLIED TO A MOTOR VEHICLE

(71) Applicant: VALEO SECURITE HABITACLE, Créteil (FR)

(72) Inventors: Eric Menard, Créteil (FR); Frédéric Gehin, Créteil (FR); Fabienne Masson, Créteil (FR)

(73) Assignee: VALEO SECURITE HABITACLE, Créteil (FR)

( * ) Notice: Subject to any disclaimer, the term of this patent is extended or adjusted under 35 U.S.C. 154(b) by 46 days.

(21) Appl. No.: 14/904,200

(22) PCT Filed: Jun. 25, 2014

(86) PCT No.: PCT/EP2014/063457

§ 371 (c)(1),
(2) Date: Jan. 11, 2016

(87) PCT Pub. No.: WO2015/003909

PCT Pub. Date: Jan. 15, 2015

(65) Prior Publication Data

US 2016/0137163 A1 May 19, 2016

(30) Foreign Application Priority Data

Jul. 12, 2013 (FR) ..................................... 13/01653

(51) Int. Cl.
*B60R 25/24* (2013.01)
*B60R 25/20* (2013.01)
(Continued)

(52) U.S. Cl.
CPC ............. *H04W 12/06* (2013.01); *B60K 28/00* (2013.01); *B60R 25/209* (2013.01); *B60R 25/23* (2013.01);
(Continued)

(58) Field of Classification Search
CPC ....... B60R 25/00; B60R 25/23; B60R 25/209; B60R 25/246; G05D 1/0276; G06F 21/32;
(Continued)

(56) References Cited

U.S. PATENT DOCUMENTS 5,559,961 A * 9/1996 Blonder ............. G07C 9/00142 726/18
7,589,434 B1 9/2009 Bronson
(Continued)

FOREIGN PATENT DOCUMENTS

CN 101 607 548 A 12/2009
DE 102 37 831 A1 2/2004
(Continued)

OTHER PUBLICATIONS

International Search Report issued in corresponding application No. PCT/EP2014/063457 dated Aug. 26, 2014 (4 pages).
(Continued)

*Primary Examiner* — Jeffrey C Boomer
(74) *Attorney, Agent, or Firm* — Osha Bergman Watanabe & Burton LLP

(57) ABSTRACT

The invention relates to a method for securing a command to be applied to a motor vehicle, characterized in that said method comprises: a first step of generating first data, via a vehicle electronic control unit; a second step of sending said first data to a mobile terminal comprising a screen, via the electronic control unit; a third step of displaying the first data on the screen of the mobile terminal; a fourth step in which a human user processes the first data in order to obtain second data; a fifth step of sending the second data to the electronic control unit via the mobile terminal; a sixth step of comparing said second data to a key of the first data, via the electronic control unit; if the second data is validated by
(Continued)

Start
710 Generation of first data
720 Transmission of first data
730 Displaying the first data
740 Processing the first data
750 Transmission of second data
760 Validation of second data
765 Valid?
Yes
No
770 Activation of motor vehicle
Stop the key of the first data, a seventh step of activating the motor vehicle via the electronic control unit, in order to implement at least part of the control.

14 Claims, 4 Drawing Sheets

(51) Int. Cl.

| | |
|---|---|
| ***B60K 28/00*** | (2006.01) |
| ***G05D 1/02*** | (2020.01) |
| ***H04W 12/06*** | (2021.01) |
| ***G06F 21/35*** | (2013.01) |
| ***B60R 25/23*** | (2013.01) |
| *H04L 29/08* | (2006.01) |
| *H04L 29/06* | (2006.01) |
| *H04W 4/40* | (2018.01) |

(52) U.S. Cl.
CPC ......... *B60R 25/246* (2013.01); *G05D 1/0276* (2013.01); *G06F 21/35* (2013.01); *H04L 63/083* (2013.01); *H04L 63/0853* (2013.01); *H04L 67/12* (2013.01); *H04W 4/40* (2018.02)

(58) Field of Classification Search
CPC ... B60H 1/00642; B60K 28/00; H04W 12/06; H04W 4/40; H04L 67/12; H04L 63/0853; H04L 63/083
See application file for complete search history.

(56) References Cited

U.S. PATENT DOCUMENTS 8,751,065 B1 * 6/2014 Kato ................. H04M 1/72533 340/426.13
8,902,045 B1 * 12/2014 Linn ....................... G06F 21/32 340/5.53
2006/0001317 A1 * 1/2006 Chen ....................... B60R 25/00 307/10.1
2006/0061458 A1 * 3/2006 Simon ..................... B60R 25/04 340/426.35
2006/0149442 A1 * 7/2006 Delaney ................. G08C 17/02 701/36
2008/0117079 A1 * 5/2008 Hassan ................. B60R 25/045 340/901
2009/0038006 A1 * 2/2009 Traenkenschuh ....... G06F 21/36 726/21
2009/0307748 A1 * 12/2009 Blom ...................... G06F 21/31 726/2
2010/0075655 A1 * 3/2010 Howarter ............ B60R 25/2009 455/420
2010/0097178 A1 * 4/2010 Pisz ...................... B60R 16/037 340/5.72
2010/0108425 A1 * 5/2010 Crespo ................. B60K 28/063 180/272
2010/0185341 A1 * 7/2010 Wilson ................ B60R 25/2045 701/1
2011/0197844 A1 * 8/2011 Matsubara .............. B60R 25/00 123/179.2
2011/0271210 A1 * 11/2011 Jones .................. H04L 12/1827 715/753
2012/0031963 A1 * 2/2012 Adipietro ............ H01M 10/465 235/375
2012/0112879 A1 * 5/2012 Ekchian ................. A61B 5/117 340/5.53
2012/0242469 A1 * 9/2012 Morgan ................. B60K 28/06 340/426.11
2012/0296567 A1 * 11/2012 Breed .................... G01C 21/26 701/468
2012/0313768 A1 * 12/2012 Campbell ........... B60R 25/2009 340/438
2013/0066525 A1 * 3/2013 Tomik .................... B60K 28/04 701/45
2013/0160098 A1 * 6/2013 Carlson ................... G06F 21/45 726/6
2014/0180523 A1 * 6/2014 Reichel ............. B62D 15/0285 701/23
2014/0342668 A1 * 11/2014 Kyomitsu .......... G07C 9/00944 455/41.2
2015/0007289 A1 * 1/2015 Godse ..................... G06F 21/31 726/7
2015/0088360 A1 3/2015 Bonnet et al.
2016/0170494 A1 6/2016 Bonnet et al.

FOREIGN PATENT DOCUMENTS

| | | | | | |
|---|---|---|---|---|---|
| EP | 0 677 801 A1 | | 10/1995 | | |
| EP | 2 216 970 A1 | | 8/2010 | | |
| EP | 2841325 B1 | | 11/2016 | | |
| FR | 2 819 067 A1 | | 7/2002 | | |
| GB | 2 433 147 A | | 6/2007 | | |
| GB | 2433147 A | * | 6/2007 | ............. | G06F 21/31 |
| WO | WO-2008005875 A2 | * | 1/2008 | ......... | H04L 63/0861 |
| WO | WO 2009017751 A1 | * | 2/2009 | ............. | G06F 21/36 |

OTHER PUBLICATIONS

INPI Search Report issued in corresponding application No. FR1301653 dated Apr. 2, 2014 (5 pages).

* cited by examiner

METHOD FOR SECURING A COMMAND TO BE APPLIED TO A MOTOR VEHICLE

TECHNICAL FIELD OF THE INVENTION

The technical field of the invention is that of motor vehicles.

The present invention relates to a method for securing a command to be applied to a motor vehicle.

TECHNOLOGICAL BACKGROUND TO THE INVENTION

In the context of a command of a motor vehicle and, in particular, in the context of a remote command, or remote control, of a motor vehicle, it is desirable to ensure that said command or remote control is in fact performed by a human user, or indeed by a human user responsible for the motor vehicle.

In order to apply a remote command to a vehicle, the prior art notably describes a use of a sustained press, on the part of the user, on a command button of a key, also referred to as an "identifier", of the vehicle. The long press generates a particular signal (for example a radiofrequency (RF) signal). When the vehicle receives the particular signal, it performs the command. A technique of this type enables the risk of incorrect handling on the part of the user to be reduced. However, this technique involving the use of a sustained press is not secured against potential hacking by an artificial intelligence, or against a malicious use, for example by a thief, or an inappropriate use, for example by a child. In fact, in order to ensure that the vehicle receives the particular signal, the behavior of the key, i.e. the particular signal and the communication protocol, must be reproduced. This can be done by listening in on the communications between the key and the vehicle. Furthermore, a user in possession of the key can control the vehicle, irrespective of his age, for example.

GENERAL DESCRIPTION OF THE INVENTION

The invention aims to offer a solution to the problems outlined above by proposing a method for securing a command to be applied to a motor vehicle, notably providing a safeguard against computer hacking. In one advantageous embodiment, it provides a safeguard against an inappropriate use of the vehicle, for example by an irresponsible user.

The invention thus essentially relates to a method for securing a command to be applied to a motor vehicle, comprising:

- a first step of generation, by an electronic control unit of the motor vehicle, of first data;
- a second step of transmission, by the electronic control unit, of the first data to a mobile terminal comprising a screen;
- a third step of displaying the first data on the screen of the mobile terminal;
- a fourth step of processing of the first data by a human user in order to obtain second data;
- a fifth step of transmission, by the mobile terminal, of the second data to the electronic control unit;
- a sixth step of comparison, by the electronic control unit, of said second data with a key of the first data;
- if the second data are validated by the key of the first data, a seventh step of activation, by the electronic control unit, of the motor vehicle for the performance of at least a part of the command.

The method of securing a command to be applied to a vehicle according to the invention notably provides a safeguard against computer hacking by carrying out the fourth step of processing of the first data by the human user, and by making the performance of said command conditional on the validation, by the electronic control unit presumed to be secure, of the result of said fourth data processing step. In fact, an artificial intelligence, for example a computer program, will not be able to perform correctly or will not be able to perform at all the processing of the first data. In this case, the seventh step of activation of the motor vehicle will not therefore be able to take place.

Apart from the characteristics that have just been outlined in the preceding paragraph, the securing method according to the invention may have one or more additional characteristics from the following, considered individually or according to all technically possible combinations:

- The first data comprise a human user authentication test. Thus, only a human user is capable of performing said human user authentication test and therefore only a human user is capable of processing the first data in such a way as to obtain second data that will be validated by the electronic control unit using the key of the first data. An artificial intelligence is thus advantageously distinguished from an intelligence of a human user.
- The securing method comprises a preliminary step of transmission, by the mobile terminal, of a request relating to the command to the electronic control unit of the motor vehicle. The user can thus deliberately request, via the mobile terminal, for example with an application of said mobile terminal, a command to be applied to the motor vehicle. Alternatively, the mobile terminal can also spontaneously request a command to be applied to the motor vehicle, for example when a vehicle proximity, date, location or temperature condition is satisfied, or when the mobile terminal has been specifically programmed for this purpose.
- The securing method comprises an alternative preliminary step of transmission, by an identifier of the vehicle, of a request relating to the command to the electronic control unit of the motor vehicle. The user can thus deliberately request, via the identifier, for example by pressing a button of said identifier, a command to be applied to the motor vehicle. Alternatively, the identifier can also spontaneously request a command to be applied to the motor vehicle, for example when a vehicle proximity condition is satisfied.
- The securing method comprises a preliminary step of the performance of an action by the human user on the vehicle. The user can thus request a command to be applied to the motor vehicle, for example by pressing a handle of a door, by pressing a pedal or by turning the steering wheel of said motor vehicle. Access to "risky" functions such as starting the engine and/or moving the vehicle can thus be advantageously secured, notably in respect of a child. At the same time, for example, a "non-risky" function, such as accessing the inside of said vehicle, can be authorized for this same child. The invention therefore advantageously enables different levels of security to be distinguished for different commands of the vehicle, depending on the degree of risk that these different commands potentially pose.
- The transmission, by the electronic control unit, of the first data to the mobile terminal is a transmission secured via a virtual private network; and the transmission, by the mobile terminal, of the second data to the electronic control unit is a secured transmission via the virtual private network. The robustness of the securing method according to the invention is thus advantageously improved.

The first, second, third, fourth, fifth, sixth and seventh steps are repeated during the performance of the command until the complete performance of the command. It is thus advantageously enabled that the securing method is carried out a plurality of times during the performance of a single command, for example during the performance of command that is likely to take some time. It is thus advantageously ensured that the user continues to approve the command and therefore to assume responsibility for said command over time. During the performance of a command, in the absence of a response, or in the absence of a correct response, on the part of the user to the authentication test, the performance of the command is then interrupted by default.

The key of the first data is generated by the electronic control unit during the first step.

The key of the first data is stored in a memory of the electronic control unit prior to the performance of the first step.

The command is chosen from the following list:
- command to lock or unlock the motor vehicle;
- command to start or stop the engine of the motor vehicle;
- command to move the motor vehicle between an initial position and a final position;
- command to switch on the heating or air conditioning of the motor vehicle.

The first data comprise an authentication test of a human user authorized to control the motor vehicle. It is thus advantageously ensured that only an authorized human user is able to actually control the motor vehicle. An inappropriate use of the vehicle, for example by an irresponsible user, is thus prevented.

The screen is a touchscreen; a predefined confidential code of symbols is stored in the electronic control unit of the motor vehicle; the third step is a step of displaying a matrix of symbols on the touchscreen; and during the fourth step, the user enters the confidential code on the touchscreen and the mobile terminal records the coordinates of the positions touched by the user. The confidential code thus advantageously remains unknown to the mobile terminal. The mobile terminal knows only data relating to positions touched by the user, and these positions are likely to change with each implementation, whereas the confidential code remains unchanged.

The invention and its different applications will be better understood from a reading of the description that follows and an examination of the accompanying figures.

BRIEF DESCRIPTION OF THE FIGURES

The figures are presented by way of indication, in no way limiting the invention.

DETAILED DESCRIPTION OF AT LEAST ONE EMBODIMENT OF THE INVENTION

Unless stated otherwise, the same element appearing in different figures has a single reference.

The invention relates to a method 100 for securing a command to be applied to a motor vehicle V. The command applied to the motor vehicle V may be, for example:
- a command to lock or unlock the vehicle V;
- a command to start or stop the engine of the vehicle V;
- a command to move the vehicle V between an initial position and a final position;
- a command to switch on or switch off the heating or air conditioning of the vehicle V.

FIGS. 1*a*, 2, 3 and 4 show steps of the method 100 according to a first operating mode. FIGS. 1*a*, 2, 3 and 4 are described jointly.

Figure 1A:
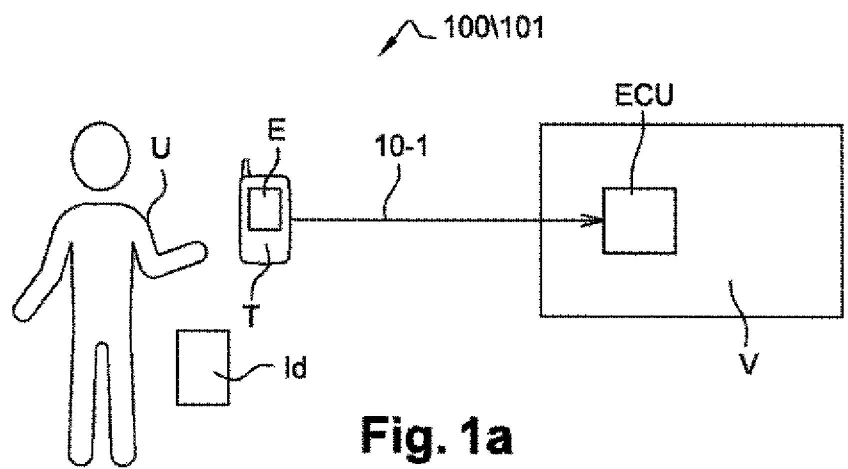
FIG. 1*a* shows a preliminary step of a method for securing a command to be applied to a motor vehicle according to the invention.

FIG. 1*a* shows a preliminary step 101 of the method 100 for securing a command applied to the motor vehicle V according to a first operating mode of the invention.

FIG. 1*a* shows:
- a human user U;
- the motor vehicle V comprising an electronic control unit ECU;
- an identifier Id of the motor vehicle V, wherein the identifier Id may be, for example, a key, a card or a magnetic badge;
- a mobile terminal T comprising a screen E.

During the preliminary step 101 according to the first operating mode of the invention, the mobile terminal transmits a request 10-1, relating to the command to be applied to the motor vehicle V, to the electronic control unit ECU of the motor vehicle V.

The preliminary step 101 may be initiated by the user U who acts on the mobile terminal T, for example by starting and using an application of said mobile terminal T.

Figure 2:
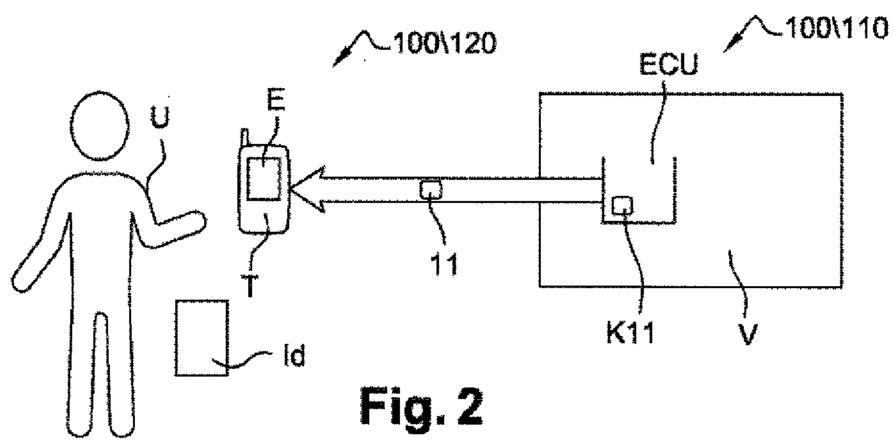
FIG. 2 shows a first step and a second step of the securing method according to one embodiment of the invention

FIG. 2 shows a first step 110 and a second step 120 of the securing method 100 according to one embodiment of the invention.

According to the first mode of operation of the invention, following the preliminary step 101, the electronic control unit ECU then generates, during the first step 110:
- first data 11 comprising a human user authentication test;
- a key K11 of the first data 11.

The human user authentication test notably enables a human user to be distinguished automatically from a machine, prone to computer hacking, such as a computer or any other device having an artificial intelligence. The aim of the authentication test is therefore to ensure that a human user, such as the user U, validates the command to be applied to the motor vehicle V and assumes responsibility for said command. The human user may himself have requested said command, or said command may have been proposed to him by the mobile terminal T.

During the second step 120, the first data 11 are then transmitted by the electronic control unit ECU to the mobile terminal T. The transmission by the electronic control unit ECU of the first data 11 to the mobile terminal T is advantageously a secure transmission, for example via a virtual private network VPN.

Figure 3:
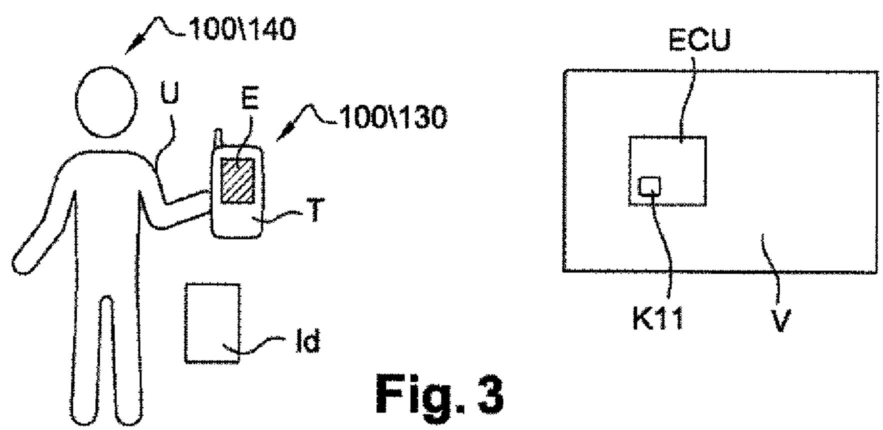
FIG. 3 shows a third step and a fourth step of the securing method according to one embodiment of the invention.

FIG. 3 shows a third step 130 and a fourth step 140 of the securing method 100 according to the first embodiment of the invention.

Figure 5A:
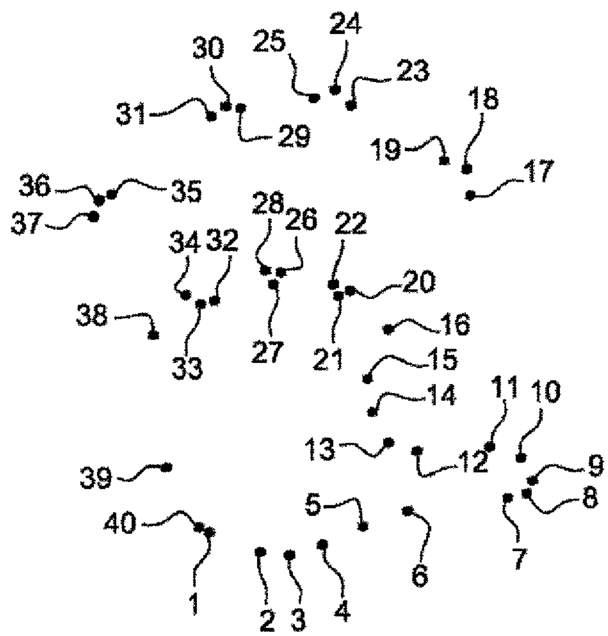
FIG. 5*a* shows an example of a possible display of a "complex point-to-point tracking" test on a screen of a mobile terminal.
Figure 5B:
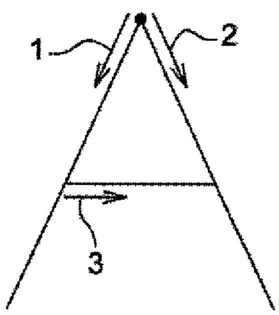
FIG. 5*b* shows an example of a possible display of a "simple point-to-point tracking" test on a screen of a mobile terminal.
Figure 5C:
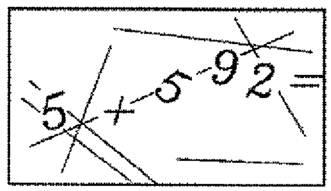
FIG. 5*c* shows an example of a possible display of an "image interpretation" test on a screen of a mobile terminal.

During the third step 130, the first data cause the display of the human user authentication test on the screen E of the mobile terminal T. For the sake of simplicity, it is assumed that the first data are displayed on the terminal T. The human user authentication test may be of different types:

- It may involve a "complex point-to-point tracking" test, as shown in FIG. 5*a*. For the performance of a test of this type, the screen E is a touchscreen.
- It may also involve a "simple point-to-point tracking" test, as shown in FIG. 5*b*. For the performance of a test of this type, the screen E is a touchscreen.
- It may also involve an "image interpretation" test, as shown in FIG. 5*c*.

During the fourth step 140, the user U carries out a processing of the first data 11 by performing the human user authentication test. The processing of the first data 11 by the human user U entails the acquisition of second data 12.

FIG. 5*a* shows an example of a possible display of a "complex point-to-point tracking" test on the touchscreen E of the mobile terminal T. FIG. 5*a* shows a plurality of numbered points, in this case forty points numbered from 1 to 40, which constitute trace indications. The human user authentication test then consists in joining up, for example with a finger or using a stylus, all the points in the indicated order. The mobile terminal T records the coordinates of the trace effected by the human user U. In this example, the second data 12 therefore comprise the coordinates of the trace effected by the human user U.

FIG. 5*b* shows an example of a possible display of a "simple point-to-point tracking" test on the screen E of the mobile terminal T. FIG. 5*b* shows a simple geometric shape formed from a plurality of segments, in this case the letter "A". FIG. 5*b* also shows three numbered arrows which constitute trace indications. The human user authentication test then consists in reproducing said geometric shape by following said segments, for example with a finger or using a stylus, in the order and in the direction indicated by the numbered arrows. The mobile terminal T records the coordinates of the trace effected by the human user U. In this example, the second data 12 therefore comprise the coordinates of the trace effected by the human user U.

FIG. 5*c* shows an example of a possible display of an "image interpretation" test on the screen E of the mobile terminal T. In this type of test, the screen E may or may not be a touchscreen. FIG. 5*c* is an image representing, on a non-uniform background, an addition operation comprising different deformed symbols—a digit "5", an addition symbol "+", a number "592" and an equals sign "=". The human user authentication test then consists in reading the operation and in performing the requested calculation, then in giving the result of the calculation, in this case "597". To do this, the human user U may, for example, use a keypad of the mobile terminal T to key in the response or to select a response from a plurality of responses proposed by the mobile terminal T. In this example, the second data 12 therefore comprise the result "597" of the operation shown in the image in FIG. 5*c*.

Alternatively, the image displayed in an "image interpretation" test may represent a combination of deformed symbols and the human user authentication test may consist in reading the combination and reproducing it, either by entering the different symbols of the combination on a keypad of the mobile terminal T, or by selecting a response from a plurality of responses proposed by the mobile terminal T.

The different examples of authentication tests of a human user described above enable an intelligence of a human user to be distinguished from an artificial intelligence.

Figure 4:
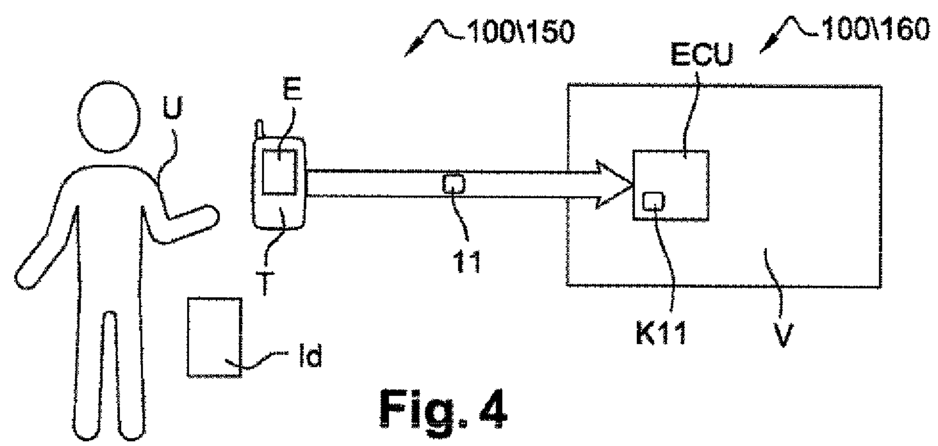
FIG. 4 shows a fifth step and a sixth step of the securing method according to one embodiment of the invention.

FIG. 4 shows a fifth step 150 and a sixth step 160 of the securing method 100 according to the first embodiment of the invention.

During the fifth step 150, the mobile terminal T transmits the second data 12 to the electronic control unit ECU. The second data 12 are advantageously transmitted in a secure manner, for example via a virtual private network VPN.

During the sixth step 160, a comparison operation is performed during which the electronic control unit ECU evaluates the second data 12 depending on the key K11 of the first data 11. At the end of the sixth step 160, the second data 12 are therefore validated or invalidated. The second data 12 may, for example, be invalidated if, in the example of a "complex point-to-point tracking" or "simple point-to-point tracking" test, a trace that is inexact or too imprecise has been effected, or if, in the example of an "image interpretation" test, an incorrect calculation or combination reproduction has been performed.

If the second data 12 are invalidated by the electronic control unit ECU, the command to be applied to the motor vehicle V is not performed.

If the second data 12 are validated by the electronic control unit ECU, the electronic control unit ECU activates, during a seventh step (not referenced), the motor vehicle for the performance of at least a part of the command.

Figure 7:
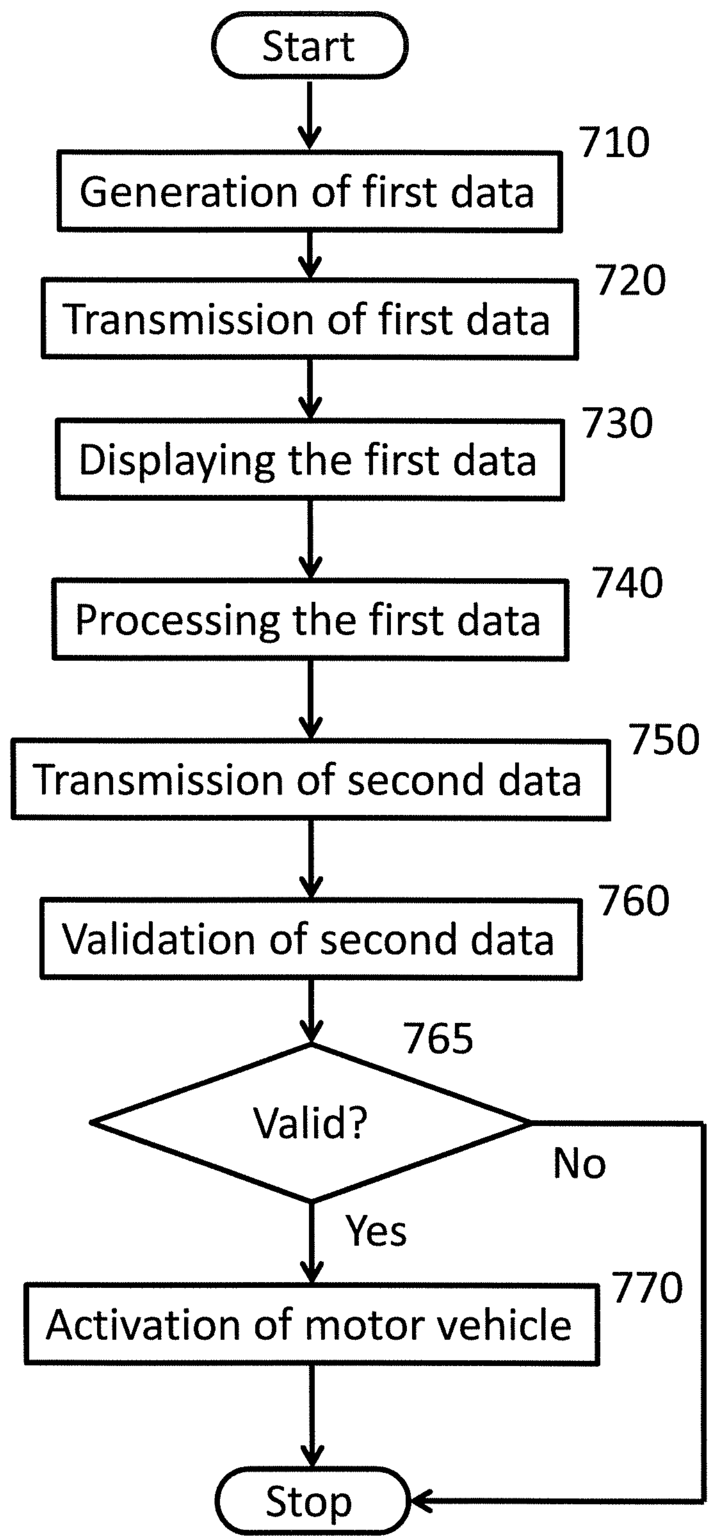
FIG. 7 shows a flowchart for one or more embodiments of the present invention.

In one or more embodiments of the present invention, a method for securing a command to be applied to a motor vehicle may comprise steps ordered as shown in the flowchart of FIG. 7:

- a first step (710) of generation, by an electronic control unit of the motor vehicle, of first data;
- a second step (720) of transmission, by the electronic control unit, of the first data to a mobile terminal comprising a screen;
- a third step (730) of displaying the first data on the screen of the mobile terminal;
- a fourth step (740) of processing of the first data by a human user in order to obtain second data;
- a fifth step (750) of transmission, by the mobile terminal, of the second data to the electronic control unit;
- a sixth step (760) of validation, by the electronic control unit, of said second data by comparison with a key of the first data;
- if the second data are validated (765) by the key of the first data, a seventh step (770) of activation, by the electronic control unit, of the motor vehicle for the performance of at least a part of the command.

A second operating mode of the invention will now be described. The second operating mode of the invention differs from the first operating mode of the invention in that:

- the first data 11 comprise an authentication test of a human user authorized to control the motor vehicle V;

the key K11 of the first data 11 is in a memory (not shown) of the electronic control unit ECU.

The objective of the authentication test of a human user authorized to control the motor vehicle V, performed in the second operating mode of the invention, is to add an additional degree of security compared with the human user authentication test used in the first operating mode of the invention. The role of the authentication test of a human user authorized to control the vehicle V is in fact to distinguish not only an intelligence of a human user from an artificial intelligence, but also to distinguish a human user authorized to control the vehicle V, such as, for example, the owner of the vehicle V, from a human user not authorized to control the vehicle V, such as, for example, a young child or a person having malicious intentions. Unlike the test of a human user, the response or the solution to the test of an authorized human user is not contained in the test in itself: the test of an authorized human user gives no indication concerning the confidential code. The second operating mode of the invention will preferably be implemented for "risky" commands, such as:

- a command to start or stop the engine of the vehicle V;
- a command to move the vehicle V between an initial position and a final position.

The first operating mode of the invention will preferably be implemented for "non-risky" commands, such as:

- a command to lock or unlock the vehicle V;
- a command to switch on or switch off the heating or air conditioning of the vehicle V.

The authentication test of a human user to control the motor vehicle V may, for example, be a "confidential code" test. For the performance of a test of this type, the screen E is a touchscreen.

A confidential code is defined prior to the implementation of the securing method 100, for example in a dealership of the motor vehicle V. The confidential code is, for example, a combination of digits, a combination of letters or a combination of digits and letters. Among all the potential human users of the motor vehicle V, the confidential code is assumed to be known only to an authorized human user of the motor vehicle V, such as, for example, the owner of the motor vehicle V. The confidential code is stored in a memory of the electronic control unit ECU, assumed to be secure.

Figure 6:
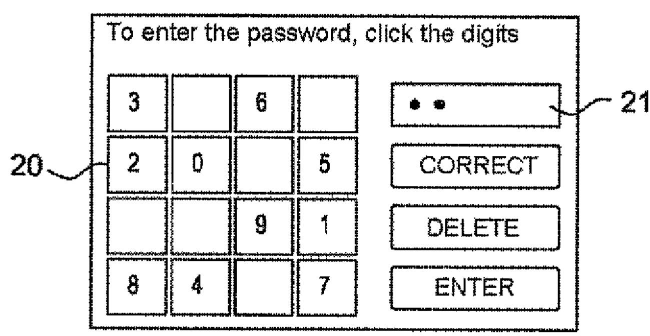
FIG. 6 shows an example of a possible display of a "confidential code" test on a screen of a mobile terminal.

FIG. 6 shows an example of a possible display of a "confidential code" test on the touchscreen E of the mobile terminal T. In the case shown in FIG. 6, the confidential code is a combination of digits. FIG. 6 shows a matrix 20 which comprises sixteen cells. Each digit, from "0" to "9", appears once only in the matrix 20. Ten cells of the matrix 20 are thus occupied, each by a different digit. The six remaining cells are empty. The positioning of the digits within the matrix 20 is advantageously random. The authorized human user inputs the confidential code by successively pressing the appropriate cells of the matrix 20. The input of each digit of the confidential code is advantageously achieved through the appearance of a neutral symbol, such as a period, in a frame 21. The authorized user thus knows when an input of a digit is effective, i.e. when an input of a digit has been taken into account by the mobile terminal T. The mobile terminal T records the position of each press. In this example, the second data 12 therefore comprise the position of the successive presses carried out by the authorized human user on the matrix 20 displayed on the touchscreen E.

A first variant of the first operating mode or of the second operating mode will now be described. According to this first variant, the securing method 100 according to the first operating mode or according to the second operating mode is iterated, i.e., for a command to be applied to the motor vehicle V, the first, second, third, fourth, fifth, sixth and seventh steps 110 to 170 are repeated sequentially. This first variant is advantageously implemented in the case of a command relating to an action likely to take some time, such as, for example:

- a command to move the vehicle V between an initial position and a final position.
- a command to switch on or switch off the heating or air conditioning of the vehicle V.

The first, second, third, fourth, fifth, sixth and seventh steps 110 to 170 may, for example, be repeated periodically. Thus, in the case of a command to switch on the air conditioning, the securing method 100 may be carried out periodically, for example every twenty minutes. The user performs the authentication test to continue the performance of the command. If the authentication test is not performed within a certain time period or if it is not validated, the command is interrupted, i.e., in the present example, the air conditioning is switched off.

The first, second, third, fourth, fifth, sixth and seventh steps 110 to 170 may also be repeated at several "strategic" times during the performance of a command. The case of a command to move the motor vehicle V between an initial position and a final position can be considered, the movement comprising a forward movement then a reverse movement. The securing method 100 may be carried out, for example:

- a first time before the performance of the forward movement;
- a second time before the performance of the reverse movement.

In the particular context of a parking maneuver, the first, second, third, fourth, fifth, sixth and seventh steps 110 to 170 can also be repeated periodically throughout the maneuver. The periods generally chosen for this type of maneuver are short, in the region of 30 ms, for example. This enables the presence and intention of the user, and therefore his responsibility, to be constantly checked.

A relevant authentication test for a parking maneuver may be similar to that shown in FIG. **5*b***, i.e. a "simple point-to-point" test.

In one alternative embodiment (not shown), the geometric shape formed on the screen may be a circle with an arrow indicating a direction of movement. Throughout the maneuver, the user thus performs a circular movement with his finger on the screen to follow the outline of the circle in the direction indicated by the arrow.

The authentication tests may be considered as failed by the ECU if the user does not make the correct gesture or if the communication of said second data is to unsuccessful.

It is advantageously possible for a certain number of failed authentication tests to be tolerated on the ECU side before stopping the command in progress. The maximum duration of authorized successive failed authentication tests must nevertheless remain limited so as not to cause an unwanted movement of the vehicle over too long a distance.

A limit of 5 failed authentication tests, for example, i.e. a time period of 150 ms, corresponding to a movement of the vehicle of some ten centimeters, will advantageously be imposed.

On the other hand, if the number of failed authentication tests is lower, the user would observe an erratic movement.

In the case of a radio communication, this notably enables some communication failures to be tolerated before stopping the maneuver in progress, thus improving the availability of the function from the user's point of view.

It is furthermore possible to resume the interrupted maneuver as soon as the authentication tests become valid once more. This is notably clearly perceived and therefore expected by the user in the case of a parking maneuver.

Conversely, for some commands such as the air conditioning, a failed authentication test stops the command in progress and said command will not be resumed even if the periodic authentication test becomes valid once more, in which case the user will have to resume the command from the start with a first authentication test.

A second variant of the first operating mode or of the second operating mode will now be described. According to this second variant, the preliminary step 101 is replaced by an alternative preliminary step 102.

Figure 1B:
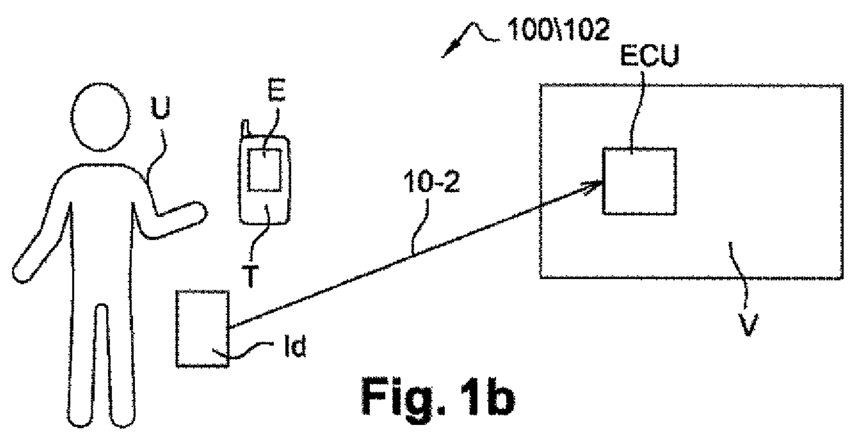
FIG. 1*b* shows an alternative preliminary step of the method for securing a command to be applied to a motor vehicle according to the invention.

FIG. 1*b* shows a schematic representation of the preliminary step 102 of the method 100 for securing a command applied to the motor vehicle V, according to the second variant of the first or of the second mode of operation. During the alternative preliminary step 102, the identifier Id of the motor vehicle V sends a request 10-1, relating to the command to be applied to the motor vehicle V, to the electronic control unit ECU of the motor vehicle V.

The alternative preliminary step 102 may, for example, be initiated:

by the user U, who acts on the identifier Id, for example by pressing a button of the identifier Id;

by the identifier Id which is, for example, programmed to initiate the preliminary step 102 when it detects the proximity of the vehicle V.

The securing method 100 then proceeds according to the first or according to the second operating mode. The second variant is compatible with the first variant, i.e., following the alternative preliminary step 102 of the second variant, the first, second, third, fourth, fifth, sixth and seventh steps 110 to 170 can be iterated.

A third variant of the first operating mode or second operating mode will now be described. According to this third variant, the preliminary step 101 is replaced by a prior step during which the user U performs an action on the motor vehicle V, such as, for example: pressing a door handle, pressing a brake, turning the steering wheel.

The securing method 100 then proceeds according to the first or according to the second operating mode. The third variant is compatible with the first variant, i.e., following the prior step of the third variant, the first, second, third, fourth, fifth, sixth and seventh steps 110 to 170 can be iterated.

The invention claimed is:

1. A method for authenticating a command to be applied to a motor vehicle, the method comprising:

a first step of generation, by an electronic control unit of the motor vehicle, of first data;

a second step of transmission, by the electronic control unit, of the first data to a mobile terminal comprising a screen;

a third step of displaying, on the screen of the mobile terminal, a human user authentication test, triggered by the first data, the human user authentication test containing within itself a solution to the human user authentication test, the solution itself being displayed on the screen to the human user;

a fourth step of performing the authentication test, by reproducing the solution to the human user test by a human user, in order to obtain second data, wherein the reproduced solution is one of correct or incorrect;

a fifth step of transmission, by the mobile terminal, of the second data to the electronic control unit;

a sixth step of validation, by the electronic control unit, of the second data by comparison with a key of the first data; and after the second data are validated by the key of the first data, a seventh step of activation, by the electronic control unit, of the motor vehicle for a performance of at least a part of the command, and wherein the command is a command to perform a driving maneuver of the motor vehicle to move the motor vehicle between an initial position and a final position.

2. The method as claimed in claim 1, further comprising a step of transmission prior to the first step, by the mobile terminal, of a request relating to the command to the electronic control unit of the motor vehicle.

3. The method as claimed in claim 1, further comprising a step of transmission prior to the first step, by an identifier of the vehicle, of a request relating to the command to the electronic control unit of the motor vehicle, wherein the identifier is a key of the vehicle, the key of the vehicle comprising a command button.

4. The method as claimed in claim 1, further comprising a step of performance of an action by the human user on the vehicle.

5. The method as claimed in claim 1:

wherein the transmission, by the electronic control unit, of the first data to the mobile terminal is secured by a virtual private network, and the transmission, by the mobile terminal, of the second data to the electronic control unit is secured by the virtual private network.

6. The method as claimed in claim 1, wherein the key of the first data is generated by the electronic control unit during the first step.

7. The method as claimed in claim 1, wherein the key of the first data is stored in a memory of the electronic control unit prior to the performance of the first step.

8. The method as claimed in claim 1, wherein the first data comprise an authentication test of a human user authorized to control the motor vehicle.

9. The method as claimed in claim 8, wherein:

the screen is a touchscreen;

a predefined confidential code of symbols is stored in the electronic control unit of the motor vehicle;

the third step is a step of displaying a matrix of symbols on the touchscreen; and during the fourth step, the human user enters the predefined confidential code on the touchscreen and the mobile terminal records the coordinates of the positions touched by the human user.

10. The method as claimed in claim 1, wherein:

the screen is a touchscreen;

the human user authentication test consists in reproducing geometric shapes displayed on the touch screen with a finger or using a stylus.

11. The method as claimed in claim 1, wherein the human user authentication test is a point-to-point tracking test comprising a plurality of numbered points which constitute trace indications.

12. The method as claimed in claim 1, wherein the human user authentication test comprises a geometrical shape displayed to the human user, and wherein the human user reproduces the geometrical shape as the solution to the human user authentication test.

13. The method as claimed in claim 1, wherein the human user authentication test requires reproduction of a gesture by the human user.

14. The method as claimed in claim 1, wherein the human user authentication test comprises an image interpretation test comprising deformed symbols displayed to the human user, and wherein the human user reads and reproduces the deformed symbols on a keypad as the solution to the human user authentication test.

* * * * *